United States Patent [19]

Watkins

[11] 4,118,883
[45] Oct. 10, 1978

[54] FISHHOOK AND RELEASING TOOL THEREFOR

[76] Inventor: Bernard Watkins, P.O. Box 223, Culver Lake, Branchville, N.J. 07826

[21] Appl. No.: 827,362

[22] Filed: Aug. 24, 1977

[51] Int. Cl.² ............................................. A01K 97/00
[52] U.S. Cl. .................................. 43/43.16; 43/44.83; 43/53.5
[58] Field of Search .................... 43/43.16, 44.83, 53.5

[56] References Cited

U.S. PATENT DOCUMENTS

| | | | |
|---|---|---|---|
| 2,616,208 | 11/1952 | Stogermayr | 43/44.83 |
| 2,815,603 | 12/1957 | Bandemer | 43/43.16 |
| 2,823,486 | 2/1958 | Behee | 43/43.16 |
| 4,014,130 | 3/1977 | Roberts | 43/53.5 |

*Primary Examiner*—Robert C. Watson
*Attorney, Agent, or Firm*—Bauer, Amer & King

[57] ABSTRACT

An improved fishhook comprises a hook-carrying member and a line-carrying member pivotally joined for relative movement therebetween. The hook-carrying member is provided with an elongated shank for engagement with a releasing handle for enabling the freeing of the fishhook from a fish caught thereon. Release is effected by maintaining the line-carrying member in a substantially vertical position and using the releasing handle as a lever to provide a mechanical advantage as it is moved through a pivotal traverse. The movement of the handle is translated to the hook-carrying member to enable release of the fish from engagement with the fishhook.

10 Claims, 3 Drawing Figures

U.S. Patent    Oct. 10, 1978    4,118,883
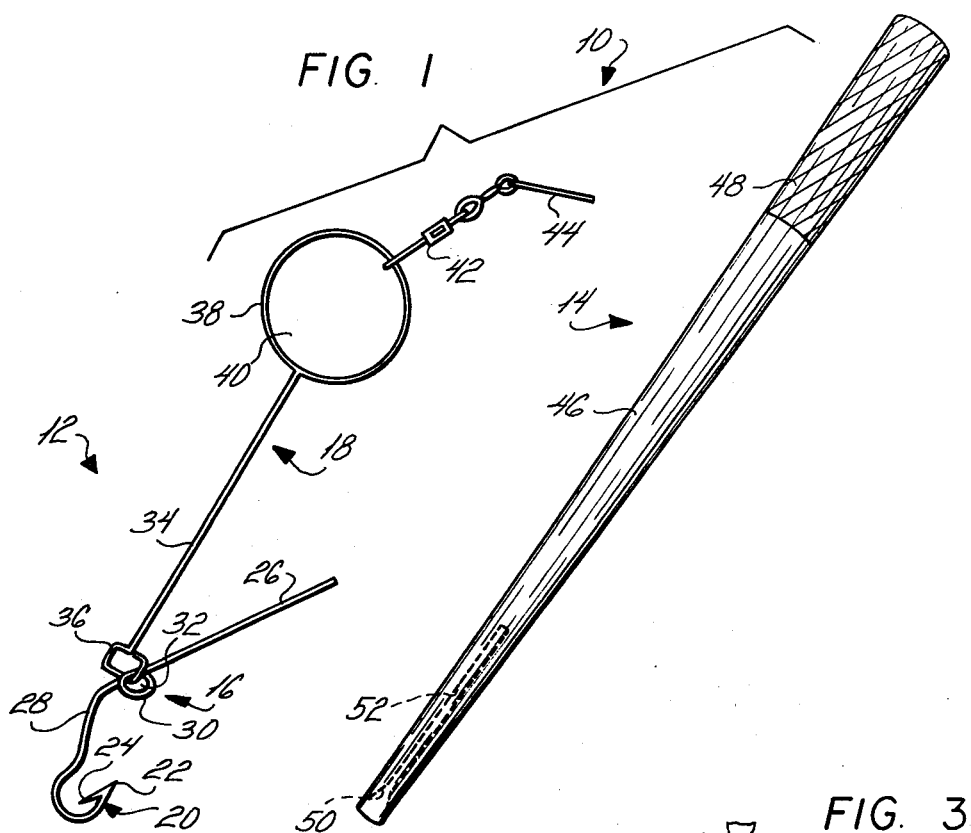
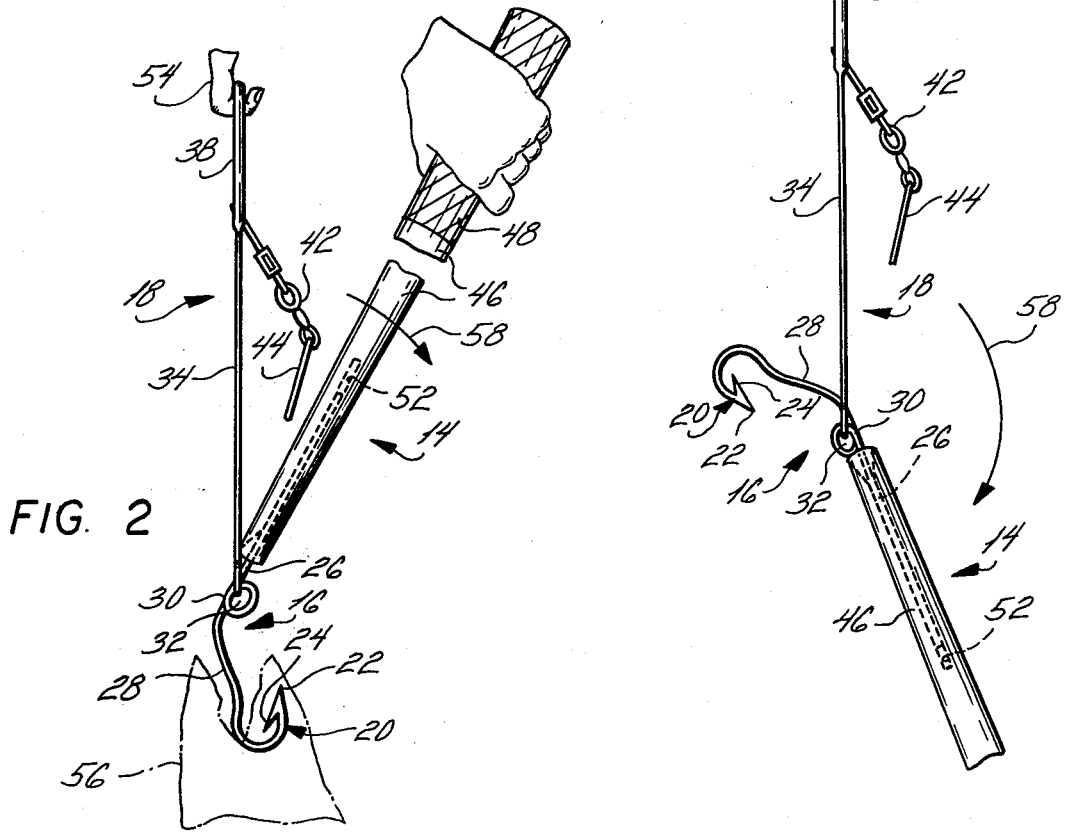

FISHHOOK AND RELEASING TOOL THEREFOR

BACKGROUND OF THE INVENTION

The present invention relates to an improved fishhook designed for facilitating release from a fish, and to a cooperating lever-type handle or tool for attachment to the fishhook to enable the disengagement of a fish from the fishhook using a mechanical advantage provided by the handle.

In the past, the usual way to unhook a fish was to turn the hook out of its engagement with the engaged mouth tissues, but this was not always easy to do nor was it beneficial to the fish. As exemplified by the patented literature, there are two techniques for facilitating this disengagement. One of these techniques, represented by U.S. Pat. No. 2,501,210, contemplates allowing the barbed tip of the hook to be released from its reverse-direction orientation for movement into substantial alignment with the remainder of the hook, all to the end of facilitating release and minimizing the amount or extent of the turning that is required in the hook. The other technique, as represented by U.S. Pat. Nos. 3,027,676 and 2,815,603, contemplates the use of a second line attached to the hook which, when pulled, urges a rotative or turning movement in the hook that is intended to cause its release.

The foregoing and similar fishhook releases are not entirely satisfactory. The former complicates the construction of the hook and is, in addition, vulnerable to inadvertently losing the required hook shape, thus allowing the fish to escape. The latter also complicates the construction of the hook and, despite the presence of an extra line attached to the hook, does not really contribute to the ease of removal of the hook because of the excessive pulling force that must be applied to the second line.

SUMMARY OF THE INVENTION

Broadly, it is an object of the present invention to provide a fishhook that enables the use of a release technique that overcomes the foregoing and other shortcomings of the prior art. Specifically, it is an object to provide a cooperating and hook-engaging handle that readily enables the hook to be turned free of the fish using a lever to provide a mechanical advantage, and thus requires little physical effort.

It is a further object of the present invention to provide a fishhook and a releasing tool for use therewith whereby disengagement of the hook from a captive fish is facilitated by the action of the force of gravity on the mass of the fish.

It is another object of the present invention to provide a fishhook and a releasing tool therefore that are simple and economical to construct and may be readily manufactured utilizing well-known techniques.

Other objects and features of the present invention will become apparent from the following detailed description considered in connection with the accompanying drawings. It is to be understood, however, that the drawings are designed for the purpose of illustration only and not as a definition of the limits of the invention, for which reference should be made to the appending claims.

BRIEF DESCRIPTION OF THE DRAWING

In the figures of the drawing, wherein like reference numerals denote like structural features:

FIG. 1 is a plan view of the releasable fishhook and manipulating handle shown in expanded arrangement according to the present invention;

FIG. 2 is a furtherperspective view of the invention wherein the releasing handle is shown in its engaged position with the fishhook prior to release of a fish therefrom; and FIG. 3 is a perspective view similar to FIG. 2 but illustrating the final position of the fishhook and the releasing handle following disengagement of a fish from the hook.

DETAILED DESCRIPTION OF THE PREFERRRED EMBODIMENT

As is of course well further perspective hooks have been used for a long time to catch fish and, for as long as they have been used, the natural way to unhook a fish has been to hold the fish with one hand while the hook is finger manipulated and turned out of engagement with the fish. If there is difficulty in unhooking, a plier or like tool is sometimes used to grip and turn the hook. The present invention is related to a significantly enhanced releasable fishhook, and a releasing tool therefor, which consists of the use of the two components illustrated in FIG. 1.

In FIG. 1 the two-part combination, generally designated by the reference numeral 10, includes a combined fishhook and line-carrying member generally designated 12 and a fishhook extracting tool or handle 14. In an unusually simple manner, and as will be described subsequently, the handle 14 is effectively used as a lever to provide a significant mechanical advantage both as to the force and the manner in which the hook generally identified as 16 is "turned" out of its engagement with the fish.

More specifically as seen in FIG. 1, the releasable combination 12 of the present invention is comprised of the hook-carrying member 16 and a line-carrying member 18. The hook-carrying member 16 is of wire-form and is provided with a fish engaging hook, generally designated by the numeral 20, which includes a point 22 and may further include a barb 24 reversely directed from the point 22 and adjacent thereto. The member 16 carries at its opposite end an elongated straight shank 26. As clearly shown in the drawing, and for reasons that will become clear as this description proceeds, the hook 20 is offset as to the longitudinal axis of the shank 26 by means of a portion 28 adjacent the hook 20. The position 28 is illustrated as curved only to demonstrate that the angle between the shank 26 and the hook point 22 is less than 180° or a straight line.

A joining means here depicted as a closed loop 30 is provided between the arcuate portion 28 and the shank 26 and may be formed by bending the central portion of the member 16 to fully bound a completed opening 32. The hook-carrying member 16 may thus be advantageously constructed as a single body with the hook 20 and the shank 26 unitary and integral and connected by the arcuate portion 28 and the loop 30. Steel or other suitably hardened metals constitute a suitable construction material for the member 16.

The line-carrying member 18 includes an elongated shaft 34 having a terminal end bent to form a closed loop 36. The loop 36 loosely encircles the loop 30 of the hook-carrying member 16 to capture the same and to enable the free pivotal or fulcruming movement of the member 16 relative to the line-carrying member 18. It should be clear that the actual configuration of the loops 30, 36 is a matter of design choice so long as the members 16,18 are freely movable with the one fulcruming relative to the another in a manner to be described. In addition, the loops 30,36 need not be integrally constructed with the members 16,18 respectively and could instead, by way of example only, consist of intertwined eyelets or the like (not shown) affixed, as by soldering, to their respective members after construction of the same.

Member 18 is provided at its opposite end with a finger grip 38 which, in the preferred form illustrated, is of a completed ring or circular configuration bounding an opening 40 appropriately sized to allow a finger of the user to be projected therethrough. The fishhook 12 will be connected to a fishing line. For this purpose, an appropriate fastening device 42 on the end of a fishing line 44 may be conveniently attached to the circular finger grip 38 of the member 18.

The extracting tool or handle 14 which cooperates with the releasable hook 12 comprises an elongated body 46 which is of an appropriate length to function as a lever and provide the previously noted mechanical advantage. In practice, it has been found that a handle 14 which measures approximately 10 inches in length satisfies the operational requirements thereof. At its proximal end, the body 46 includes an appropriate hand grip 48 which may consist of a textured surface to enhance the user's grip thereon or of a suitably widened portion (not shown) thereat. The handle 14 may advantageously be configured to have a circular cross section and to be generally frustoconical or tapered along its longitudinal axis.

The distal end of the body 46 is provided with a shallow conically-shaped flared entrance cavity 50. A bore 52 begins at the apex of the cavity 50 and runs longitudinally through at least a portion of the body 46. The bore 52 is sized transversely and longitudinally for receipt therein of the shank 26 in a manner to be described while the flared entrance of cavity 50 facilitates the introduction of the shank into the confines of the bore.

The use of the releasable fishhook 12 in conjunction with the handle 14 to effectuate the release of a fish that is caught on the hook 20 can readily be understood from FIGS. 2 and 3. First, the user inserts a lifting-supporting finger 54 through the opening 40 in the circular finger grip 38 of the line-carrying member 18. A fish 56 caught on the hook 20 is thus supported by the finger 54 through its engagement with the finger grip 38. The weight of the fish 56 will serve to maintain the line-carrying member 18 in a relatively vertical position, and the hook-carrying member 16 will, as shown in FIG. 2, be positioned with the hook 20 in substantial alignment with the longitudinal axis of the member 18 and with the shank 26 offset therefrom.

Next, the distal end of the handle 14 is applied and coupled to the shank 26, this coupling being readily effected by allowing the shank 26 to enter through the conical cavity 50 into the hollow confines of the longitudinal bore 52. Manipulation of the handle 14 is performed by having the user grasp the proximal end thereof with his other hand at the grip portion 48 thereon.

Release of the fish 56 is completed by next rotating the handle 14 through a pivotal traverse in the direction shown by the arrow 58 in FIG. 2 to achieve the position shown in FIG. 3. It should be clear that movement of the handle 14 in the direction shown will translate to a corresponding movement of the shank 26 and thereby pivot and fulcrum the member 16 relative to the member 18 about the interconnected loops 30,36. As the hook 20 is thereby rotated upward and leftward in FIG. 2, gravity exerts a constant downward force on the fish 56 to maintain the same in a relatively vertical position. Thus, by the time the hook 20 reaches the position shown in FIG. 3 by reason of the pivotal movement of the handle 14 and its corresponding action on the shank 26 engaged thereby, the fish 56 will have been pulled from engagement with the hook 20 through the action of the force of gravity on the mass of the fish.

It is seen to be generally unnecessary, then, for the user to hold the fish 56 or directly exert any outside force thereon to effectuate its release from the fishhook 12 of the present invention since the weight of the fish will normally be sufficient to effect its disengagement therefrom as the hook 20 is rotated to the position of FIG. 3. Should the fish 56 fail to come completely free of the hook 20 due to the presence of the barb 24, a slight rocking action on the handle 14 may be used to complete its release.

Following disengagement of the fish 56 from the hook 20, the user may remove the handle 14 from its engagement with the fishhook 12. The pivotal traverse of the handle 14 in the direction indicated by the arrow 58 has thus been shown to be an effective manipulation which causes a rotative movement of the hook 20 about the coupled loops 30,36 through engagement of the handle 14 with the shank 26. By maintaining the member 18 in a fixed substantially vertical position and advantageously employing the normal gravitational force on the mass of the fish 56, the effective release or extraction from the fish of the hook 20 is easily accomplished.

In practice, it has been found that the fishhook-extracting procedure, as just described, is readily and easily effectuated because of the mechanical advantage that results from the use of the handle 14. That is, handle 14 as used in the manner just described functions much like a lever in which force applied at the grip end 48, due to mechanical advantage, is magnified at the opposite end thereof to force the barb 24 on the hook 20 of its engagement with a captive fish.

From the foregoing description it should be readily appreciated that when used in the combination as described the releasable fishhook 12 and the handle 14 constitute a noteworthy, simply constructed, yet effective pair of cooperating structures which significantly contribute to a facilitated release of the fishhook 12 from any engaged fish. While preferred structural features have been illustrated, it should be readily apparent that various departures are possible. For example, the finger grip 38 need not be of a completed circular configuration, but may be only semi-circular or have some other shape which is compatible with the necessity of its being held, as by a finger of the user, to maintain the line-carrying member 18 in a substantial vertical position during the disengagement of a fish from the hook 20. Naturally, if the finger grip 38 is not provided as a complete circular configuration, the fishing line 44 will be required to be connected to a loop or other appropriate structural feature provided directly on the fishhook 12.

In other respects, as well as those just noted, a latitude of modification, change and substitution is intended in the foregoing disclosure and in some instances some features of the invention will be employed with a corresponding use of other features. Accordingly, it is appropriate that the appended claims be construed broadly and in a manner consistent with the spirit and scope of the invention therein.

What is claimed is:

1. In combination,
    a releasable fishhook comprising:
    a hook-carrying member having a fish-engaging hook at one end thereof, an elongated shank at its opposite end and joining means intermediately positioned therebetween and a line-carrying member having finger gripping means at one end thereof and fulcrum means at its opposite end for engagement with said joining means and about which said joining means fulcrums to engage the free movement of said hook-carrying member relative to said line-carrying member; and
    a fishhook extracting handle to function as a lever so as to provide a mechanical advantage, said handle having means thereon for engaging said shank to enable the use of said handle to manipulate said hook-carrying member through an arcuate traverse at said joining means to release a fish from engagement with said hook, whereby during said manipulation said finger-gripping means is held to maintain said line-carrying member in a relatively vertical position.

2. The combination as claimed in claim 1, said fish-engaging hook having a point at the end thereof and further including a barb reversely directed from said point and adjacent thereto.

3. The combination as claimed in claim 2, said hook-carrying member having a portion adjacent said fish-engaging hook to offset said hook from straight line alignment with said shank.

4. The combination as claimed in claim 1, said joining means comprising a closed loop formed on said hook-carrying member for pivotal engagement with said fulcrum means.

5. The combination as claimed in claim 4, said fulcrum means comprising a closed loop on said line-carrying member for loosely engaging said joining means to enable the capture of said hook-carrying member and the free movement thereof relative to said line-carrying member.

6. The combination as claimed in claim 1, said finger-gripping means being of a completed circular configuration so as to handle its advantageous use to complete a connection of said releasable fishhook to fishing line.

7. The combination as claimed in claim 1, said fishhook extracting handle being configured as an elongated member of a selected length.

8. The combination as claimed in claim 7, said shank-engaging means comprising a longitudinal bore in said fishhook extracting handle, said shank being adapted to be received in said bore and thereafter being urged through hook-extracting manipulation by contact with the defines of said bore disposed in encircling relation about said shank.

9. In combination,
    a releasable fishhook comprising:
    a hook-carrying member having a barbed fish-engaging hook at one end thereof, an elongated straight shank portion at its opposite end and an intermediately-disposed looped portion therebetween and a line-carrying member having a ring-like portion at one end thereof and an eye at its opposite end for engagement with a fishing line, said ring-like portion being loosely journaled on said looped portion to enable pivotal movement of said hook-carrying member relative to said line carrying member; and
    an elongated fishhook extracting handle of a selected length to function as a lever providing a mechanical advantage during fishhook-extracting service thereof, said handle having a longitudinal bore starting at one end thereof at a flared entrance and extending through at least a portion of said handle for receiving said elongated shank portion, whereby to release said hook from engagement with a fish said line-carrying member is held at said eye in a substantially vertical position aided by the gravitational force exerted thereon by the mass of the fish and said handle is effectively utilized to manipulate said hook-carrying member through a pivotal traverse to lift the hook into a vertical position opposite the gravitational force exerted on the fish to enable the hook to release its engagement therewith.

10. The combination as claimed in claim 9, including portion on said hook-carrying member intermediate said hook and said looped portion to offset said hook from alignment with said shank.

* * * * *